(Model.)

E. N. McKIMM.
CHURN.

No. 279,100. Patented June 5, 1883.

WITNESSES:
Chas. Nida
C. Sedgwick

INVENTOR:
E. N. McKimm
BY Munn & Co
ATTORNEYS.

UNITED STATES PATENT OFFICE.

EDGAR N. McKIMM, OF LATHROP, MISSOURI, ASSIGNOR TO HIMSELF AND THOMAS V. WHIPPELL, OF SAME PLACE.

CHURN.

SPECIFICATION forming part of Letters Patent No. 279,100, dated June 5, 1883.

Application filed January 22, 1883. (Model.)

*To all whom it may concern:*

Be it known that I, EDGAR N. McKIMM, of Lathrop, in the county of Clinton and State of Missouri, have invented new and useful Improvements in Churns, of which the following is a full, clear, and exact description.

Reference is to be had to the accompanying drawings, forming a part of this specification, in which similar letters of reference indicate corresponding parts in both the figures.

Figure 1:
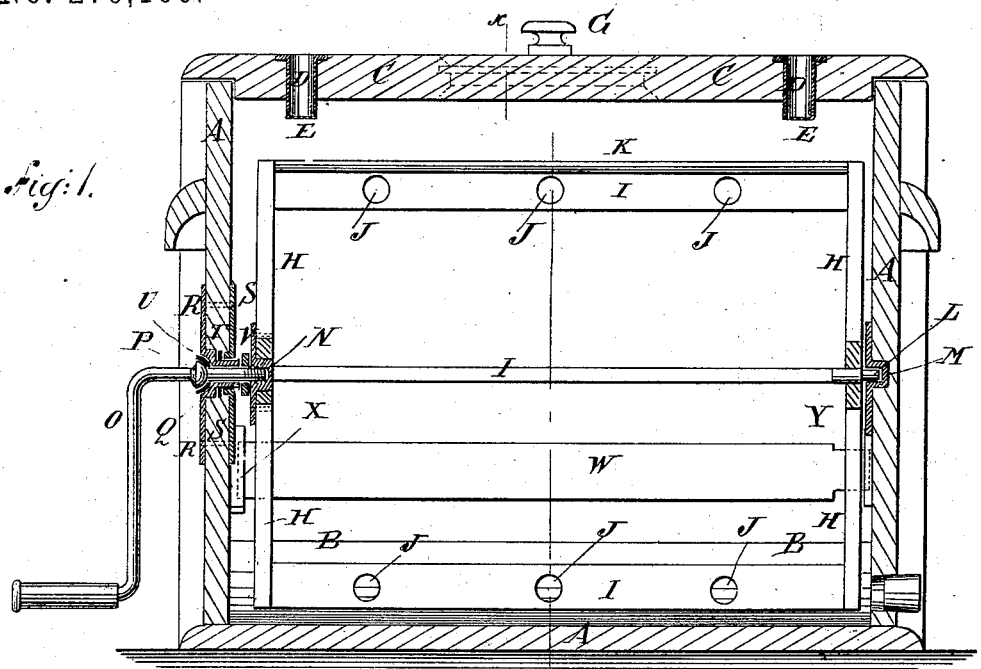
Figure 2:
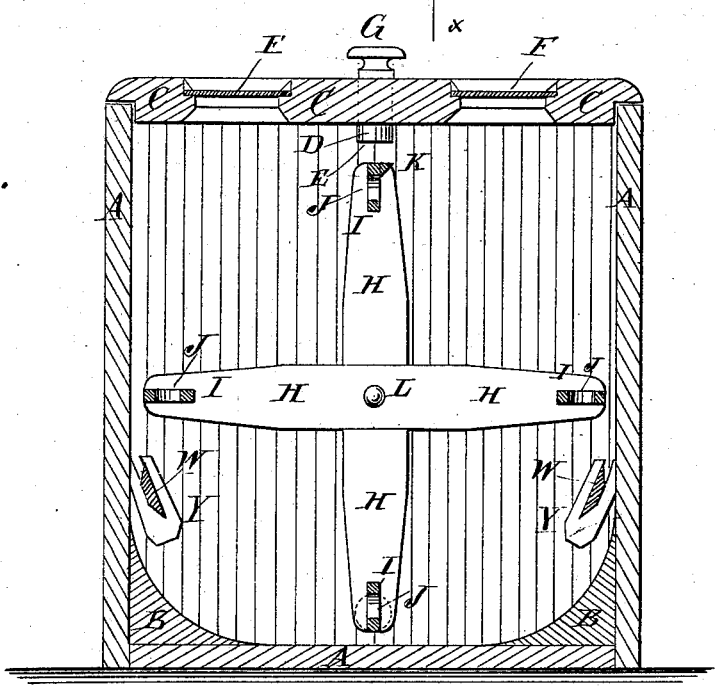

Figure 1 is a sectional side elevation of my improvement. Fig. 2 is a sectional end elevation of the same, taken through the line $x\, x$, Fig. 1.

The object of this invention is to facilitate the operation of churning and promote convenience in cleaning the churn.

A represents the body of the churn, which is made in the form of a rectangular box. The side angles at the bottom of the box A are filled by triangular blocks B, the inner sides of which are concaved to correspond with the sweep of the dasher, hereinafter described.

C is the churn-cover, the lower side of the edges of which is rabbeted to receive and fit upon the top edge of the box A, and thus prevent the cream from spattering out.

In the end parts of the cover C are formed apertures in which are secured short tubes D. The lower ends of the tubes D project below the lower surface of the cover C, and to their lower ends are soldered or otherwise secured fine wire-gauze E. With this construction air will be admitted freely, while the spattering of cream through the said opening will be prevented.

In the side parts of the cover C are formed openings in which are secured glass plates F, so that the progress of the churning can be inspected without its being necessary to remove the cover.

Each end of the dasher is formed of two bars, H, crossing each other at right angles at their centers, and framed to each other or otherwise secured at the point of crossing.

To the ends of the parallel arms of the bars H are secured the ends of longitudinal bars I, which are placed in radial positions, and have apertures J formed through them for the passage of the cream.

To one side of the outer edge of one or more of the longitudinal bars I is attached, or upon it is formed, a flange, K, which is beveled to an edge, as shown in Fig. 2, and which is designed to assist in cutting the cream and gathering the butter.

To the center of one end of the dasher H I is attached a pivot, L, which enters and revolves in a socket, M, let into and secured to the inner side of one end of the box A. To the center of the other end of the dasher H I is attached a nut, N, into which is screwed the shaft of a crank, O. The crank O passes in through a hole in the end of the box A, and has a ball or spherical collar, P, formed upon it to limit its inward movement. The ball-collar P fits into a recess in the outer end of the sleeve or bushing Q, inserted in the hole in the end of the box A, to form a bearing for the shaft of the crank O, and which has a flange, R, upon its outer end, for convenience in securing it to the end of the box A. The inner end of the bearing Q passes through a hole in a plate, S, secured to the inner side of the end of the box A, and which is provided with a rubber washer, T, to prevent the cream from leaking out around the bearing Q. A rubber washer, U, is placed between the ball-collar P and the recessed end of the bearing Q, to prevent cream from leaking out around the crank-shaft.

V is a washer interposed between the nut N and the inner end of the bearing Q, or a projection of one or the other of said parts, to prevent the end of the dasher H I from being drawn too close to the end of the box A by screwing in the crank O.

In the box A, a little above the corner-pieces B, are placed longitudinal bars W, one end of each of which is placed in a socket in a block or holder, X, attached to one end of the said box A. The other ends of the bars W are inserted in grooves in blocks Y, attached to the other end of the box A. The blocks X Y are placed in inclined positions, as shown in Fig. 2, so that the bars I of the dasher will sweep across and close to the inner surfaces of the bars W. The upper and lower parts of the outer sides of the bars W are beveled to form a free passage for the cream between the said bars and the angle-blocks B and sides of the box A. The grooves in the blocks Y allow the bars W to be readily put in and taken out. With this construction the dasher H I and the bars W can be readily taken out to allow the various parts of the churn to be conveniently and thoroughly cleaned and the butter to be conveniently removed from the churn.

In using the churn the passage of the bars I through the cream forces a part of the cream between the bars W and the sides of the box A, forces a part of the cream before them, and allows another part of the cream to escape through the apertures J, so that the cream will be forced into violent agitation, bringing the butter in a very short time.

Having thus fully described my invention, I claim as new and desire to secure by Letters Patent—

The combination, with the rectangular body carrying concave blocks B and longitudinal bars W, of the cover C, provided with gauze-covered air-tubes D, and a dasher formed of crossing bars H H, carrying parallel arms and cross-bars I, open at J and having beveled edges K, as shown and described.

EDGAR N. McKIMM.

Witnesses:
  W. H. BOHART,
  JAS. H. CHENOWETH.